(12) United States Patent
Kinghorn et al.

(10) Patent No.: US 11,555,909 B2
(45) Date of Patent: Jan. 17, 2023

(54) RADAR SYSTEMS

(71) Applicant: LEONARDO MW LIMITED, Essex (GB)

(72) Inventors: Anthony Kinghorn, Basildon (GB); Christopher Mountford, Basildon (GB)

(73) Assignee: LEONARDO UK LTD., London (GB)

( * ) Notice: Subject to any disclaimer, the term of this patent is extended or adjusted under 35 U.S.C. 154(b) by 120 days.

(21) Appl. No.: 16/961,535

(22) PCT Filed: Jan. 11, 2019

(86) PCT No.: PCT/EP2019/050643
§ 371 (c)(1),
(2) Date: Jul. 10, 2020

(87) PCT Pub. No.: WO2019/138041
PCT Pub. Date: Jul. 18, 2019

(65) Prior Publication Data
US 2021/0364623 A1    Nov. 25, 2021

(30) Foreign Application Priority Data

Jan. 11, 2018   (GB) .................................... 1800455
Jul. 27, 2018   (GB) .................................... 1812325

(51) Int. Cl.
*G01S 13/48*   (2006.01)
*G01S 13/42*   (2006.01)
*H01Q 25/00*   (2006.01)

(52) U.S. Cl.
CPC ............ *G01S 13/48* (2013.01); *G01S 13/424* (2013.01); *G01S 13/426* (2013.01); *H01Q 25/00* (2013.01)

(58) Field of Classification Search
CPC .... G01S 13/003; G01S 13/424; G01S 13/426; G01S 13/48; G01S 13/536; G01S 2013/0227; H01Q 25/00
See application file for complete search history.

(56) References Cited

U.S. PATENT DOCUMENTS 5,128,683 A * 7/1992 Freedman ................ H01Q 3/26
342/158
8,009,080 B2   8/2011 Mizutani et al.
(Continued)

FOREIGN PATENT DOCUMENTS

JP   H06249944 A   9/1994
JP   2010256333 A   11/2010
(Continued)

OTHER PUBLICATIONS

International Search Report (PCT/ISA/210) dated Jun. 17, 2019, by the European Patent Office as the International Searching Authority for International Application No. PCT/EP2019/050643.
(Continued)

*Primary Examiner* — Timothy X Pham (57) ABSTRACT

A radar system for air volume surveillance, the radar having a transmitter and receiver with separate antennas. The receiver aperture being relatively large compared with the transmitter aperture such that the receiving beam is narrower than the transmitting beam, which itself is relatively small compared with the volume to be surveyed. Multiple receiving beams can be configured so that collectively they substantially match the angular volume of the transmitting beam; and in which the transmitter is arranged, when operating, to transmit a signal with a duty cycle greater than fifty percent.

18 Claims, 5 Drawing Sheets

(56) References Cited

U.S. PATENT DOCUMENTS

| | | | |
|---|---|---|---|
| 2006/0012511 A1* | 1/2006 | Dooi | G01S 13/87 342/111 |
| 2010/0253574 A1 | 10/2010 | Mizutani et al. | |
| 2015/0048965 A1 | 2/2015 | Cornic et al. | |
| 2015/0070208 A1 | 3/2015 | Goto et al. | |
| 2018/0074161 A1* | 3/2018 | Rosenbaum | G01S 13/765 |

FOREIGN PATENT DOCUMENTS

| | | |
|---|---|---|
| JP | 2012251625 A | 12/2012 |
| JP | 2015055577 A | 3/2015 |
| JP | 2017096868 A | 6/2017 |

OTHER PUBLICATIONS

Written Opinion (PCT/ISA/237) dated Jun. 17, 2019, by the European Patent Office as the International Searching Authority for International Application No. PCT/EP2019/050643.

First Office Action dated Sep. 7, 2021, by the Japanese Patent Office in corresponding Japanese Patent Application No. 2020-538555, and an English Translation of the Office Action. (4 pages).

Office Action (Communication) dated May 19, 2022, by the European Patent Office in corresponding European Patent Application No. 19 700 482.3. (4 pages).

* cited by examiner

RADAR SYSTEMS

The present invention relates to a radar system and methods of operating a radar system.

Most conventional radar systems comprise a co-located transmitter and receiver which share a common antenna and/or reflector (and thus aperture) to transmit and receive. A pulsed signal is transmitted and the time taken for the pulse to travel to the object and back allows the range of the object to be determined.

Such radar systems are used in various applications, for example, target detection and recognition and air search. Known designs for search radar systems fall into two broad classes. Both of these classes use a single shared transmit/receive antenna transmitting and receiving pulsed waveforms.

The first class of search radar systems find use in all domains, namely for use across air, land and sea and typically transmit a single beam of electromagnetic radiation for search which is raster scanned over the area of interest. It is a disadvantage of this class of search radar system that this need to steer the radar beam to all positions in the area to be searched normally restricts the use of this system either to physically small, mechanically scanned antennas, or radars with electronically scanned antennas which can provide the necessary rapid beam steering with a physically large antenna.

The second class of search radar systems use a 'stacked beam' antenna and are normally only found in ground and naval radars. In such known systems, the antenna typically provides several simultaneous receive beams stacked in elevation, with a single broad, often shaped, transmit beam. This design avoids the need for the rapid elevation beam steering required by the first class of radar systems and is better suited to physically large mechanically scanned systems.

The performance of both first and second classes of radars described above is governed by the search radar range equation, which is dependent upon three key factors:

The total transmitted energy that can be delivered to the target during the search dwell (or 'time on target')

The total surface area of the receiving antenna (to intercept reflected energy from the target)

The spatial matching of transmit and receive beam patterns (to avoid energy wastage)

The total transmitted energy that can be delivered to the target during the search dwell is the product of the radar system Effective Radiated Power (ERP, the power transmitted and directed using beamforming) and the dwell time.

It is a known artefact of search radar systems that when searching an area of space for targets a large ERP can be achieved by using a larger antenna with a narrower beam, but this necessitates a shorter dwell time if the same area is to be searched in the same overall time. The higher ERP and shorter dwell time compensate (to first order) and thus the total transmitted energy on target remains approximately constant. Thus a high gain transmit beam is not necessarily an advantage in this class of radar for detection purposes.

In principle, it is always beneficial to system sensitivity to have the largest possible receiving antenna surface area. However, well-known antenna diffraction theory dictates that a larger receiving antenna will always have a narrower beam (to first order, the spatial coverage of the beam and the antenna area are reciprocally related). It can thus be seen that a larger receiving antenna is not necessarily beneficial as its narrower beam will become mismatched with the size of the transmitting beam resulting in a loss of useful energy and thus sensitivity (to first order, the spatial coverage of the transmitting and receiving beams should be the same to eliminate such losses).

This requirement for spatial matching of the transmit and receive beam patterns can be overcome by forming multiple simultaneous receive beams, which in total cover the same angular region as the transmit antenna. In known systems this has previously been achieved, for example, by using multiple feed horns on a single reflector antenna. The same result can be achieved by using an electronically scanned antenna with digital beamforming. In such a design, the antenna is sub-divided into multiple sub-arrays each of which is fed to an individual digitizing receiver. The digital outputs of this plurality of receivers can then be digitally combined in different ways to produce multiple beams simultaneously. Each of these beams has the same beamwidth (dictated by the total size of the antenna) but can be directed in different directions, thus forming a 'fan' of beams which together can cover a larger spatial region than a single beam.

These approaches have been used to create area search radars which have the key advantage that they can search a given area more rapidly. This is achieved by using a broad transmit beam (either a fixed 'floodlight' or a broad scanning beam) together with a multi-beam receiving antenna where the multiple beams collectively cover the same spatial region as the transmit beam.

These techniques are already well-known in the art and have been variously described using terms such as 'multi-beam radar', 'holographic radar' and 'MIMO radar'.

According to an aspect of the invention there is provided a radar system for air area surveillance comprising a transmitter having a transmitting aperture, the transmitter arranged, when operating, to transmit a signal with a duty cycle greater than 50 percent; a receiver having a receiving aperture, the transmitting and receiving apertures being separate and configured to allow both the transmitter and receiver to operate simultaneously; the transmitting aperture providing a transmitting beam with an angular area which is relatively small compared with the angular area of space to be surveyed; means to scan the transmitting beam over the angular area of space to be surveyed; the receiving aperture being larger than the transmitting aperture such that a receiving beam formed from this aperture is narrower than the transmitting beam; means to form multiple receiving beams simultaneously from the receiving aperture, the multiple receiving beams configured such that collectively they substantially match the angular area of the transmitting beam; means to scan the multiple receiving beams over the angular area of space to be surveyed so as to match the scanning of the transmitting beam.

According to another aspect of the invention there is provided a method of operating a radar system for air area surveillance, the radar system comprising: a transmitter having a transmitting aperture; a receiver having a receiving aperture, the transmitting and receiving apertures being separate and configured to allow both the transmitter and receiver to operate simultaneously; the transmitting aperture providing a transmitting beam with an angular area which is relatively small compared with the angular area of space to be surveyed; the receiving aperture being larger than the transmitting aperture such that a receiving beam formed from this aperture is narrower than the transmitting beam; the method comprising: operating the transmitter to provide a transmitting beam with a duty cycle greater than fifty percent; scanning the transmitting beam over the angular area of space to be surveyed; forming multiple receiving beams simultaneously from the receiving aperture, the multiple receiving beams configured such that collectively they substantially match the angular area of the transmitting beam; and scanning the multiple receiving beams over the angular area of space to be surveyed so as to match the scanning of the transmitting beam. The following relates to both aspects of the invention.

Because the transmitter and receiver have separate apertures, the antenna for each can be of simpler construction compared to conventional radars employing duplexed transmit/receive antennas that share an aperture. This allows lossy duplexing components needed to protect the receiver to be eliminated, which further enhances the sensitivity of the system, increases the power transmitted into free space and improves receive sensitivity. These simplifications have the dual benefit of enhancing radar performance and reducing cost.

Furthermore it is comparatively straightforward to construct a receive-only antenna that can operate over a wide bandwidth.

The use of separate apertures enables operation of the transmitter at a higher duty cycle than would normally be feasible with a conventional time shared transmit/receive antenna. The transmitter may be arranged, when in operation, to transmit a substantially continuous signal which allows higher performance to be achieved.

By way of example, if we consider a conventional radar using a common aperture for transmit/receive with area A and operating with a transmit duty cycle of D1 and power density of ρ, and compare with the system of the invention having say a transmitting aperture of area A/N where N is greater than one, the same power density p, a duty cycle D2, and a receiving aperture of area A. If we use these two systems to survey the same angular area of space in the same time, it can be shown that the performance of the two systems will be the same provided D2=N×D1.

Because the receiver can operate continuously it is possible to avoid performance penalties associated with the blanking of the receiver during transmit of conventional radar systems using a duplexed antenna.

In conventional radar system employing duplexed antennas, transmit duty cycles of between 5%-33% are commonly employed. In order for the present system to provide equivalent performance, this would require the receiving antenna aperture to be between 3 and 20 times the size of the transmitting antenna aperture. As such it is preferred that the receiving antenna aperture is at least three times the size of the receiving antenna aperture.

Because the aperture of the transmitter is smaller than receiver, the transmitter antenna can be physically smaller and lighter than the receiver antenna. In a number of applications the transmitter antenna may be mounted above (though not necessarily directly above) the receiver antenna. Where this is so, it reduces the top weight of the radar system which significantly reduces the size and cost of the tower/mast required to support the antenna. Where the radar system is carried by a ship or land vehicle, this may also allow a substantially smaller vehicle design to be adopted.

To obtain a very substantial benefit it is favourable that the transmitter aperture (and thus transmitter antenna) is positioned at least 5 m higher above the earth's surface than the receiver aperture (and thus receiver antenna).

In one arrangement there is provided a radar system (e.g. a naval radar system), wherein the transmitter comprises an antenna which is physically smaller than the receiver antenna, and in which the transmitter antenna is supported by a tower/and or mast (e.g. of a watercraft (ship, boat or other craft that travels on water)), such that the transmitter antenna and thus transmitter aperture is higher than the receiver antenna.

The receiver antenna may be mounted about the base of the mast/tower though not necessarily supported by the mast/tower.

The receiver may comprise an electronically scanned array antenna.

The transmitter may comprise an electronically scanned array antenna.

Scanning of the transmitting beam and forming and scanning of the multiple receiving beams simultaneously from the receiving aperture may be carried out using digital beam forming techniques known to those skilled in the art using a suitably programmed beam forming processor.

The radar system may comprise a first and second transmitter the first and second transmitters arranged to operate at different frequencies; the receiver arranged to be sensitive to both transmitting frequencies of the first and second transmitters. By using two separate transmitters, each can be optimized (e.g. antenna design, power added efficiency) for their specific bands of operation.

The use of different frequencies has a number of advantages. For example it:
  allows the radar to detect frequency-dependent target characteristics, which is a significant aid to target recognition;
  allows the radar to better detect targets whose signature is frequency dependent;
  offers better capabilities to deal with frequency-dependent phenomena such as ducting, multipath and atmospheric attenuation;
  enables the radar system to be employed in a multiple input multiple output (MIMO) configuration, using the two transmitters as separable sources. This allows the synthesis of a much larger receive antenna with commensurate improvements in angular measurement angular accuracy;
  offers improved anti-jamming capabilities.

The first transmitter may comprise a first transmitting antenna and the second transmitter may comprise a second transmitting antenna. Both the first and second transmitting antennas may be located, when in use, at least 5 m higher above the earth's surface than the receiver antenna.

The radar system may comprise a further receiver, the transmitter and the further receiver sharing the transmitting aperture; and wherein the radar system is configured to be switchable between a first mode and second mode; wherein in the first mode the transmitter is arranged, when operating, to transmit a signal with a duty cycle greater than fifty percent, though favourably a substantially continuous signal, and the receiver is arranged to receive a signal from the transmitter reflected from a target; and a second mode in which the transmitter is arranged to transmit a pulsed signal (e.g. with a duty cycle less than 50%) and the further receiver is arranged to receive the signal from the transmitter reflected from the target.

The antenna(s) of the transmitter and further receiver are favourably mounted above the receiver antenna.

In the first mode the combination of the small transmitting aperture and large receiving aperture provides for long range target detection above the radar horizon, whereas in the second mode, the high mounted transmit/receive aperture provides for short range detection out to the radar horizon which is determined by the height of the transmit/receive aperture.

As such the system is favourably adapted when operating in the first mode (e.g. by suitable direction of the transmitting beam), to scan for targets within the radar horizon, and when operating in the second mode, to scan for target beyond the radar horizon.

The radar system may be used as a search radar for use on a wide range of platforms across air, sea, land and space.

The invention will now be described by example with reference to the accompanying drawings in which:

FIGS. 4A & 4B are schematic diagrams of the radar system similar to FIG. 3 but with a single transmitter antenna, mounted on a ship; FIG. 4A illustrates operation of the radar system in a first mode for long range surveillance above and beyond the radar horizon and FIG. 4B illustrates use in a second mode for short range use to the radar horizon.

Figure 1:
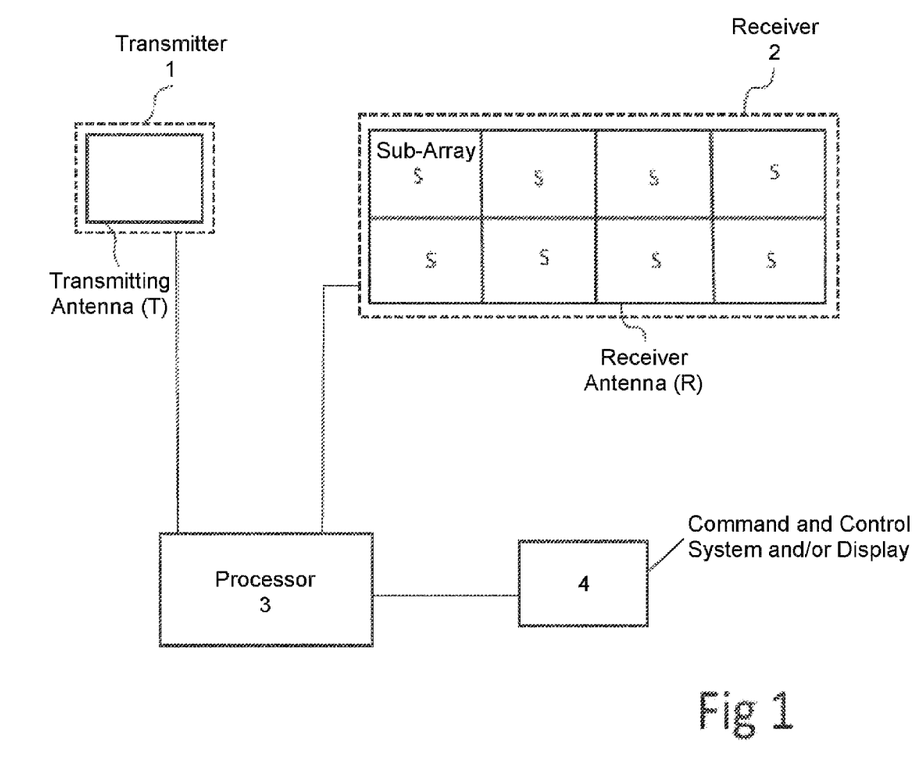
FIG. 1 is a schematic diagram of radar system comprising separate transmit and receive antennas.

With reference to FIG. 1 there is shown schematically a radar system for air volume surveillance having a transmitter 1 and receiver 2 and control and processing means 3. The radar system may be connected to or further comprise a command and control system and/or display 4, either or both can be of conventional form. The control and processing means 3 is implemented using digital computing hardware that is suitably programmed by those skilled in the art.

The transmitter 1 comprises an electronically scanned transmit-only array antenna T of area $\alpha_1$. The receiver 2 comprises an electronically scanned receiving array antenna R. The receiving antenna has area $\beta$ where $\alpha<\beta$. The receiving antenna R is comprised from a number N (where N>1) sub-arrays (S), each of an area approximately equal to $\alpha_1$. Antennas T and R are physically separate such as to have separate antenna apertures. Antenna T may be arranged, when in use, to be physically above antenna R.

Purely by way of an example, transmit antenna T could have a square aperture 0.25 m×0.25 m operating at 10 GHz, which gives rise to a transmitted beam width of approximately 7°; receiver antenna R could be rectangular, 1 m×4 m, subdivided into 64 sub-arrays. The approximate beamwidth of the complete receiver antenna is 1.70°×0.40°, but the beamwidth of each sub-array is approximately the same as the transmit antenna T.

The transmit antenna T is arranged to operate to provide a substantially continuous wave signal and is typically relatively narrow-band, <~10% fractional bandwidth, however, it will be appreciated that the bandwidth may differ.

The receiver 2 comprises a set of N sub-array receivers, one for each sub-array each sub-array receiver of the set of N sub-array receivers provides a discrete digital output. The outputs from the receivers are processed by the processing means 3 enabling the computation of multiple simultaneous beams on reception at the antenna R. Each beam covers a subset of the space illuminated by the transmitting antenna T, the complete set of beams covering the entirety of the space illuminated by the transmitting antenna T.

In use, a continuous wave signal is transmitted from the transmitting antenna T1. The receiving antenna R detects echoes from target(s) illuminated by the transmitting antenna. The outputs from the set of N sub-array receivers of the sub-arrays are combined using techniques known to those skilled in the art to produce a single (relatively narrow) beam using digital beam forming; this process is used to simultaneously produce multiple relatively narrow beams in slightly different directions to produce a spatial fan of narrow beams covering the relatively broad transmit beam.

The steps above provide spatially matched transmit and receive beams, whilst utilising the full area of the receiving antenna R, thereby providing maximum sensitivity.

In order to further illustrate the advantages of the invention, consider the following examples:

1. A conventional single-band radar using a transmit/receive antenna of area A, operating at a transmit duty cycle of ⅛ with a peak power of P per unit area
2. A single-band radar system as described above employing a receive-only array also of area A divided into 8 sub-arrays, each with its associated receiver, plus a single transmit antenna of area A/8, transmitting CW with a peak power of P per unit area It will be appreciated by a person skilled in the art, that these two systems provide approximately the same radar performance for searching the same angular area in the same time, and have similar total power requirements.

However, the novel radar system described above, primarily by virtue of its low cost/unit area receive array, may have a system cost of between 25% and 50% of the conventional system.

It will be appreciated that the transmit antenna T operating to provide continuous wave transmission will provide the maximum radar sensitivity; however, the system will still operate if the transmit antenna T is operated at reduced duty cycle. In order for the system to provide comparable performance to conventional solutions using a transmit/receive antenna. The transmitter operates at a duty cycle above 50%.

Figure 2:
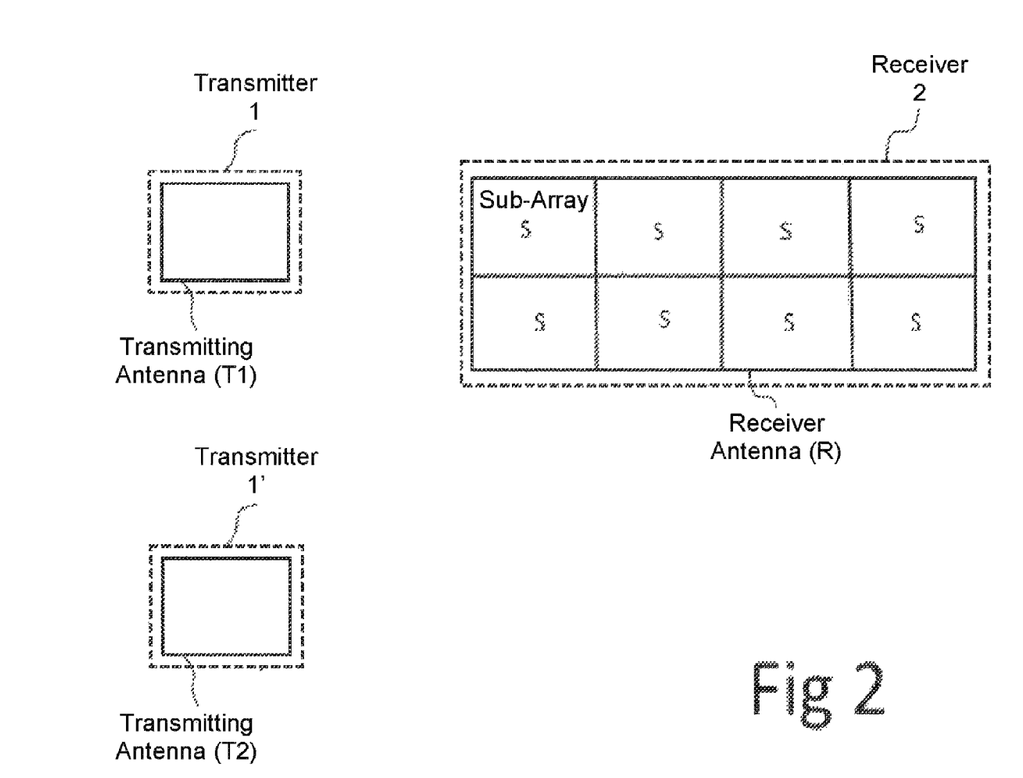
FIG. 2 is a schematic diagram of a radar system having two transmit antennas and a single receive antenna.

FIG. 2 illustrates an alternative configuration of antenna for a radar system. There is shown a first transmitter 1 comprising an electronically scanned transmit only antenna T1 of area $\alpha_1$, and a second transmitter 1' comprising a second electronically scanned transmit only antenna T2 of area $\alpha_2$ and a receiver 2 having an electronically scanned receive only antenna R of relatively large area $\beta$ where $\alpha_1<\beta$ and $\alpha_2<\beta$. The receiver antenna R is sub-divided into a number N of sub-arrays (S), each of an area approximately equal to the smaller of $\alpha_1$ or $\alpha_2$ (if different). The receiver antenna R is capable of receiving simultaneously any of the frequencies used by the transmitting antennas T1, T2.

The transmitting antenna T1, T2 are arranged to operate at different widely-spaced frequencies. These could be chosen to ensure that different target or environmental phenomena can be exploited to improve detection. For example, T1 may operate in X-band (~10 GHz) and T2 in S-band (~3 GHz). X-band provides narrower beam widths and can thus provide more accurate data for target location and tracking than S-band, where the spatial accuracy and resolution is some 3× poorer. However, S-band is much less susceptible to degradation in performance in bad weather, as attenuation in rain is almost an order of magnitude (in dB/km) lower than in X-band. Target characteristics also tend to differ significantly between bands; this can be valuable both to enhance target detection and to aid target recognition.

The relatively narrowband transmit antenna T1, T2 can be individually optimised to operate at maximum efficiency in a manner that would not be achievable in a dual band transmit/receive antenna.

A further advantage is that this antenna arrangement enables the radar system to be employed in a multiple input multiple output (MIMO) configuration, using the two transmitters T1 and T2 as separable sources. This allows the synthesis of a much larger receive antenna with commensurate improvements in angular measurement accuracy.

Another advantage is that it offers considerable anti-jamming capabilities by deploying widely spaced frequencies.

Each transmitting antenna T1, T2 is arranged to illuminate a common (and same angular) area of space each with a substantially continuous wave (CW) signal which is typically relatively narrow-band, <~10% fractional bandwidth; however, it will be appreciated that the bandwidth may differ. The transmitting antennas T1 and T2 are physically and electronically arranged so as to minimize any coupling to the receiver antenna R. This may be accomplished in a variety of ways depending upon the radar installation. For example, if space permits, they may simply be widely separated; or if a more compact arrangement is required (for example on a ship or aircraft) the some form of shielding, typically employing radar absorbent material, may be employed.

A signal is transmitted from one or more of the transmitting antennas T1, T2. It will be appreciated that if more than one transmit antenna T1, T2 is used, the transmissions are advantageously carried out on different frequencies, each frequency being sufficiently separated from the others to ensure that mutual interference can be controlled and mitigated. Some form of time multiplexing may be used instead but disadvantageously this reduces the mean power (and hence sensitivity) of the radar system.

The receiver 2 comprises a set of N sub-array receivers, one for each sub-array S, each with a discrete digital output. This set of sub-array receivers enables the computation of multiple simultaneous beams on reception at the antenna R. Each beam covers a subset of the space illuminated by the transmitting antenna(s), the complete set of beams covering the entirety of the space illuminated by the transmitting antenna(s).

The receiving antenna R detects echoes from target(s) illuminated by the transmitting antenna(s). The outputs from all the sub-arrays receivers are combined to produce a single (relatively narrow) beam using digital beam forming; this process is simultaneously carried out multiple times in slightly different directions in order to produce a spatial fan of narrow beams covering the relatively broad transmit beam(s).

The receiving antenna R is capable of operating over a wide band encompassing all expected transmit frequencies. Digital beamforming is repeated for each transmit frequency thus providing independent outputs for each transmitted frequency.

It will be appreciated that more than two transmit antennas T1, T2 may be used each arranged to transmit at a different frequency band from the others.

In an alternative arrangement a single transmitting antenna may be arranged to transmit signals in two frequency bands. This arrangement is less preferred as with two antennas each can be separately optimized to operate at maximum efficiency. Additionally the use of two antennas avoids the major drop in efficiency necessitated by simultaneous multi-frequency operation in a single antenna.

Figure 3:
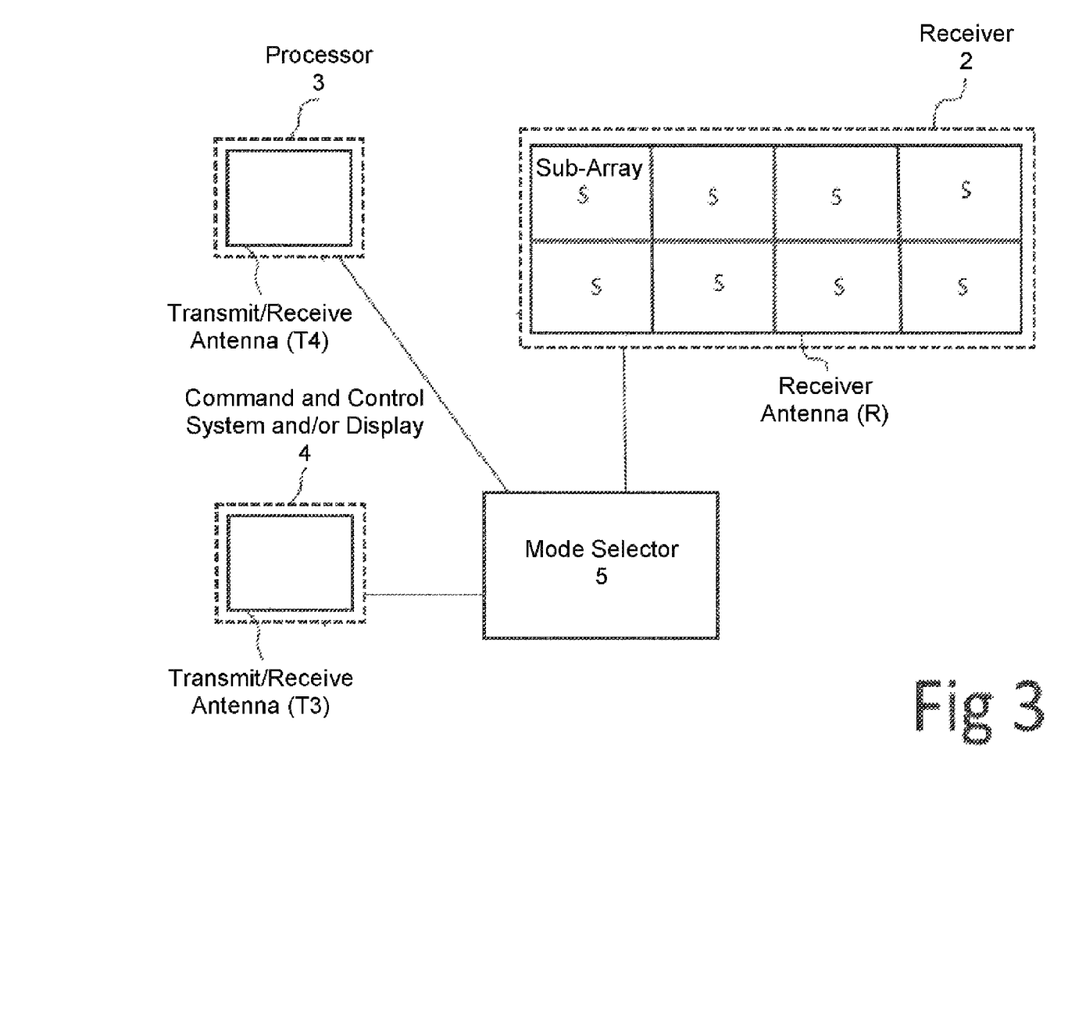
FIG. 3 is a schematic diagram of a radar system having a transmit/receive antenna and a single receive antenna adapted to switchable between two modes of operation.

FIG. 3 illustrates a radar system with a further variant antenna configuration comprising two transmit/receive antennas T3 T4 and a relatively large receive only antenna R.

The radar system has a mode selector 5 (e.g. implemented as a function of the radar system controller) that enables the system to be switched between two modes of operation. In a first mode, the system operates as described above wherein the two transmit/receive antennas T3 T4 are employed as transmit only antennas. In a second mode, the transmit/receive antennas T3 T4 are employed as conventional common aperture antennas. In one arrangement of the second mode the receiving antenna is not used. In a variant arrangement of the second mode the receiving antenna is used to augment the receiving function of the transmit/receive antennas T3 T4. The advantage of this configuration is that the antennas may be disposed to provided substantially different spatial coverage, for example the antennas T3 T4 may be widely separated in height from the receiver antenna R to extend the radar horizon.

Figure 4A:
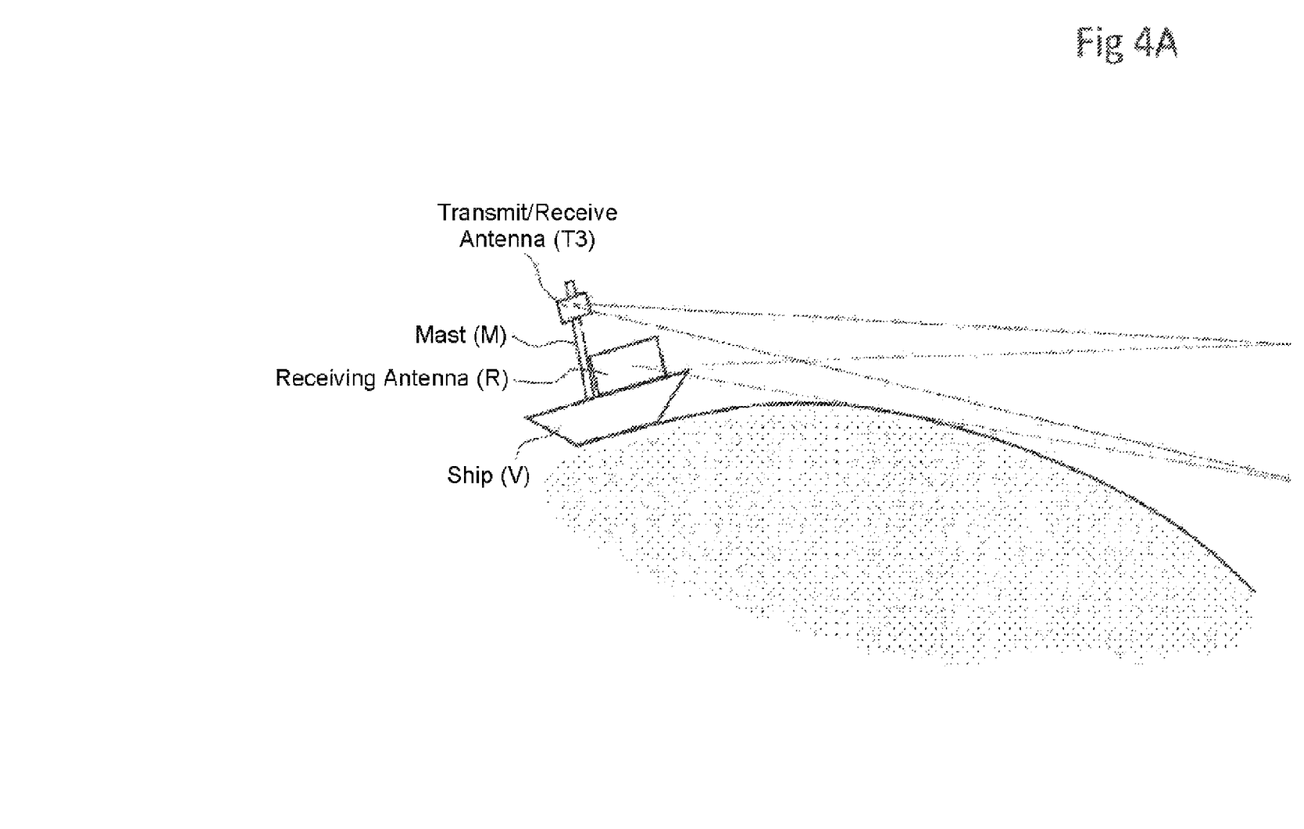
Figure 4B:
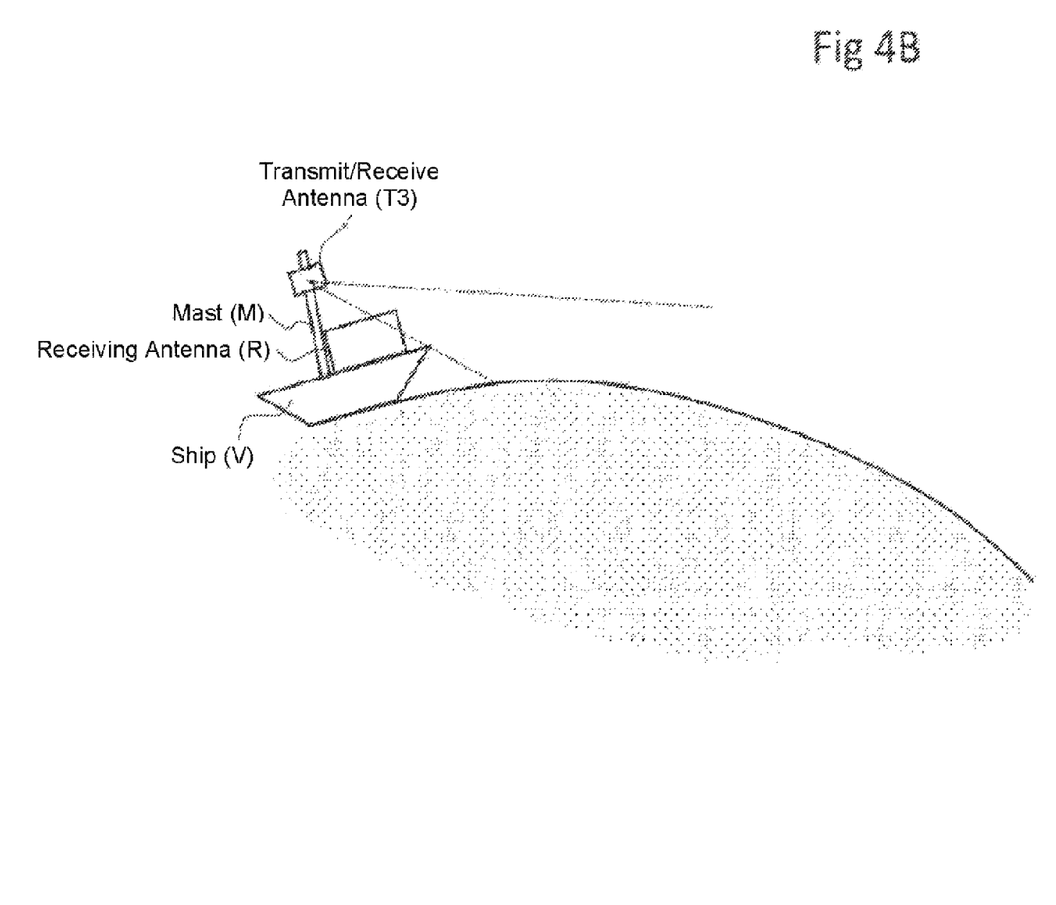

FIGS. 4A 4B illustrate an implementation of a variant antenna arrangement described in FIG. 3 employed as a ship borne airspace surveillance radar.

The radar system comprises a relatively small transmit/receive antenna T3 (though it may have two or more) mounted about the top of the ship's V mast M, and one or more much physically larger receive-only antenna R mounted lower down on the ship's V superstructure or about base of the mast M. The transmit/receive antenna T3 is favourably mounted so as to be 5 metres or higher than the larger receive antenna R. On larger ships the transmit/receive antenna may be 10 metres or higher than the receive antenna. The relatively small size and weight of the transmit/receive antenna T3 minimises mast top weight.

The radar system is able to switch between two modes of operation depending upon function desired. For surveillance above the radar horizon as illustrated in FIG. 4A, the radar system operates in a first mode as described in relation to FIG. 1 in which the relatively small transmit/receive antenna operates in a transmit only mode to provide a CW signal and the large low-mounted antenna R acts to receive. This mode provides greater sensitivity and range and thus can be used to detect target beyond the radar horizon.

In a second mode the relatively small transmit/receive antenna T3 operates in a conventional duplex transmit/receive fashion with beams directed downwards to provide surveillance out to the radar horizon, a distance which is determined by the height of the transmit/receive antenna. In this mode the larger receiver antenna R is not used; however as the range to the radar horizon is relatively short, the lower sensitivity of the relatively small transmit/receive antenna T3 is still sufficient to provide satisfactory performance. It will be appreciated that the radar system could be similarly implemented on other platforms, e.g. ground vehicle carried radar systems or fixed position radar system.

The invention claimed is:
1. A radar system for air area surveillance comprising:
   a transmitter with an associated transmitting aperture configured to provide a transmitting beam with an angular area which is relatively small compared with an angular area of space to be surveyed by the transmitter;
   means to scan the transmitting beam over an angular area of space to be surveyed;
   a receiver with an associated receiving aperture that is larger than the transmitting aperture such that a receiving beam formed from this aperture is narrower than the transmitting beam;
   the transmitting and receiving apertures being separate and configured to allow both the transmitter and receiver to operate simultaneously;
   means to form multiple receiving beams simultaneously from the receiving aperture, the multiple receiving beams being configured such that collectively they substantially match the angular area of the transmitting beam;

means to scan the multiple receiving beams over an angular area of space to be surveyed so as to match the scanning of the transmitting beam; and a further receiver, the transmitter and the further receiver being configured and arranged to share the transmitting aperture; and wherein the radar system is configured to be switchable between a first mode and second mode; wherein in the first mode the transmitter is arranged, when operating, to transmit a signal with a duty cycle greater than fifty percent and the receiver is arranged to receive a signal from the transmitter reflected from a target; and in the second mode the transmitter is arranged to transmit a pulsed signal and the further receiver is arranged to receive the signal from the transmitter reflected from the target.

2. The radar system according to claim 1, wherein in the first mode the transmitter is configured and arranged, when operating, to transmit a substantially continuous signal.

3. The radar system according to claim 2, wherein the transmitter comprises:
a transmitter antenna configured to be positioned higher above the earth's surface than a receiver antenna associated with the receiver.

4. The radar system according to claim 3, wherein the transmitter antenna is positioned at least 5 metres higher above the earth's surface than the receiver antenna.

5. The radar system according to claim 4, comprising:
a further transmitter, the transmitter and further transmitter configured and arranged to operate at different frequencies; and
the receiver is configured and arranged to be sensitive to the transmitting frequencies of both the transmitter and the further transmitter.

6. The radar system according to claim 5, wherein in the first mode the transmitter is configured and arranged to transmit a substantially continuous signal.

7. The radar system according to claim 6, wherein the transmitter and further receiver are, when the radar system is in operation, mounted above the receiver antenna.

8. The radar system according to claim 7, wherein the system is configured to, when operating in the first mode, scan for a target within the radar horizon, and when operating in the second mode, to scan for a target beyond the radar horizon.

9. The radar system according to claim 1, wherein the transmitter comprises:
a transmitter antenna configured to be positioned higher above the earth's surface than a receiver antenna associated with the receiver.

10. The radar system according to claim 9, wherein the transmitter antenna is positioned at least 5 metres higher above the earth's surface than the receiver antenna.

11. The radar system according to claim 1, comprising:
a further transmitter, the transmitter and further transmitter configured and arranged to operate at different frequencies; and
the receiver is configured and arranged to be sensitive to the transmitting frequencies of both the transmitter and the further transmitter.

12. The radar system according to claim 1, wherein in the first mode the transmitter is configured and arranged to transmit a substantially continuous signal.

13. The radar system according to claim 12, wherein the system is configured to, when operating in the first mode, scan for a target within the radar horizon, and when operating in the second mode, to scan for a target beyond the radar horizon.

14. The radar system according to claim 1, wherein the transmitter and further receiver are, when the radar system is in operation, mounted above the receiver antenna.

15. A method of operating a radar system for air area surveillance, the radar system including a transmitter having a transmitting aperture;
a receiver having a receiving aperture, the transmitting and receiving apertures being separate and configured to allow both the transmitter and receiver to operate simultaneously;
the transmitting aperture providing a transmitting beam with an angular area which is relatively small compared with an angular area of space to be surveyed;
the receiving aperture being larger than the transmitting aperture such that a receiving beam formed from this aperture is narrower than the transmitting beam; and
a further receiver, the transmitter and the further receiver being arranged to share the transmitting aperture; and
the method comprising:
operating the transmitter to provide a transmitting beam;
scanning the transmitting beam over the angular area of space to be surveyed;
forming multiple receiving beams simultaneously from the receiving aperture, the multiple receiving beams configured such that collectively they substantially match the angular area of the transmitting beam; and
scanning the multiple receiving beams over the angular area of space to be surveyed so as to match the scanning of the transmitting beam; and
switching the radar system between a first mode and second mode; wherein in the first mode the transmitter transmits a signal with a duty cycle greater than fifty percent and the receiver is arranged to receive a signal from the transmitter reflected from a target; and in the second mode the transmitter is arranged to transmit a pulsed signal and the further receiver is arranged to receive the signal from the transmitter reflected from the target.

16. The method according to claim 15, wherein in the first mode the transmitter is operated to transmit a substantially continuous signal.

17. The method according to claim 16, wherein when operating in the first mode, the system scans for a target within the radar horizon, and when operating in the second mode, scans for a target beyond the radar horizon.

18. The method according to claim 15, wherein when operating in the first mode, the system scans for a target within the radar horizon, and when operating in the second mode, scans for a target beyond the radar horizon.

* * * * *